(12) United States Patent
Laval et al.

(10) Patent No.: US 7,856,858 B2
(45) Date of Patent: Dec. 28, 2010

(54) SAFE GEAR BOX FOR ELECTRICAL STEERING COLUMN LOCK

(75) Inventors: Anthony Laval, Creteil (FR); Harald Starken, Creteil (FR)

(73) Assignee: Valeo Sicherheitssysteme GmbH, Erdweg (DE)

( * ) Notice: Subject to any disclaimer, the term of this patent is extended or adjusted under 35 U.S.C. 154(b) by 396 days.

(21) Appl. No.: 11/667,135

(22) PCT Filed: Nov. 2, 2005

(86) PCT No.: PCT/EP2005/055704

§ 371 (c)(1),
(2), (4) Date: Apr. 25, 2008

(87) PCT Pub. No.: WO2006/048423

PCT Pub. Date: May 11, 2006

(65) Prior Publication Data

US 2009/0007612 A1    Jan. 8, 2009

(30) Foreign Application Priority Data

Nov. 5, 2004    (DE) .................... 10 2004 053 438

(51) Int. Cl.
*B60R 25/02*    (2006.01)
(52) U.S. Cl. ....................................... 70/186
(58) Field of Classification Search ........... 70/182–186, 70/252

See application file for complete search history.

(56) References Cited

U.S. PATENT DOCUMENTS

| | | | | |
|---|---|---|---|---|
| 4,466,262 A | * | 8/1984 | Maiocco et al. | 70/252 |
| 5,271,252 A | * | 12/1993 | Yasuhara et al. | 70/186 |
| 5,495,732 A | * | 3/1996 | Nagae et al. | 70/252 |
| 6,233,986 B1 | * | 5/2001 | Suzuki et al. | 70/186 |
| 6,675,673 B2 | * | 1/2004 | Starken | 74/527 |
| 6,880,374 B2 | * | 4/2005 | Yukihara et al. | 70/186 |
| 2003/0217572 A1 | * | 11/2003 | Lee et al. | 70/186 |

(Continued)

FOREIGN PATENT DOCUMENTS

DE    199 29 435 A1    1/2001

(Continued)

OTHER PUBLICATIONS

International Search Report for PCT/EP2005/055704 mailed Jan. 2, 2006 with translation (4 pages).

*Primary Examiner*—Lloyd A Gall
(74) *Attorney, Agent, or Firm*—Osha Liang LLP

(57) ABSTRACT

A steering lock for locking the steering spindle of a motor vehicle steering system including a blocking element that pivots along a longitudinal axis from a locking to an unlocking position using an electromechanical drive and is maintained in the unlocking position by a spring-loaded lever. In order to enable the lever to maintain the blocking element in the unlocking position when a worm drive generates the displacement of the blocking element, a worm gear representing a first control contour is used. A first cam for pivoting the blocking element to the unlocking position and a second cam for actuating the lever are mounted on the worm gear. Prior to the pivoting of the blocking element from the unlocking to the locking position, the lever is pivoted from a rest into a release position and, only afterwards, the worm gear enables the blocking element to pivot to the locking position.

17 Claims, 5 Drawing Sheets

U.S. PATENT DOCUMENTS

2006/0070414 A1* 4/2006 Limburg et al. ............... 70/186
2006/0169010 A1* 8/2006 Limburg ....................... 70/186

FOREIGN PATENT DOCUMENTS

| | | |
|---|---|---|
| DE | 100 22 831 A1 | 12/2001 |
| DE | 199 64 173 C2 | 12/2001 |
| DE | 100 41 018 A1 | 3/2002 |
| EP | 1 176 065 A2 | 1/2002 |
| EP | 1 486 386 A2 | 12/2004 |
| WO | WO-2004/098960 A1 | 11/2004 |

* cited by examiner

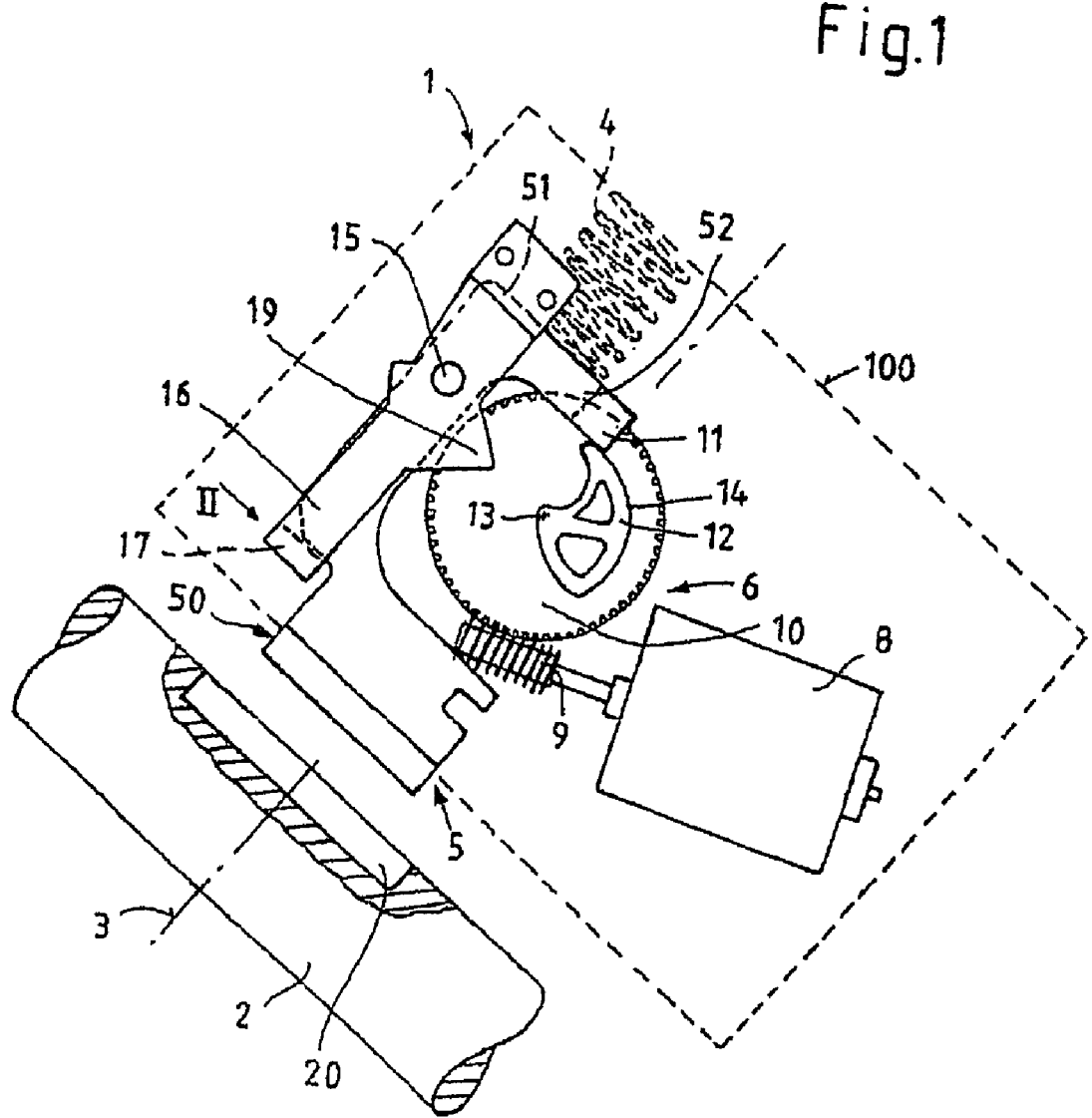
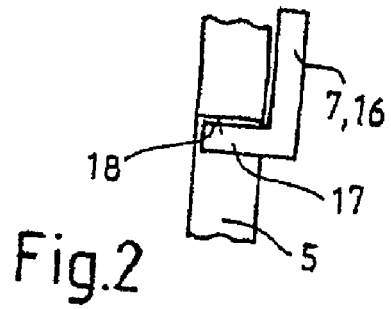

SAFE GEAR BOX FOR ELECTRICAL STEERING COLUMN LOCK

FIELD OF THE INVENTION

The invention relates to a steering lock for locking the steering spindle of a motor vehicle steering system.

BACKGROUND OF THE INVENTION

A steering lock of this type is known, for example, from DE 199 64 173 C2. In this case, the steering lock comprises a blocking element which is displaceable in the direction of its longitudinal axis, is actuable from the locking position into an unlocking position by means of an electromechanical drive and is securable in the unlocking position by a securing element. The electromechanical drive is a spindle drive. The activation of the securing element in order to release the blocking element, when the latter is to be displaced from its unlocking position into its locking position, takes place by means of a control cam which is supported on a control contour of the threaded spindle, said control contour being situated on that side of the threaded spindle, which faces away from the blocking element. Due to the large distance between the control contour and the blocking element, a space-consuming lever device is required for this known steering lock.

DE 199 29 435 A1 discloses a steering lock in which a worm drive is used as the electromechanical drive, with the worm wheel of the drive coaxially surrounding a lifting element connected axially to the blocking element such that the axis of the worm wheel and of the blocking element coincide. A securing of the blocking bolt in its unlocking position is not envisaged, and therefore, for example if the worm wheel is damaged, a situation which is questionable in terms of safety may occur (displacement of the blocking element into the locking position during a journey).

SUMMARY OF THE INVENTION

The invention is based on the object of indicating a steering lock of the type mentioned at the beginning, in which the blocking element is securable in its unlocking position in a simple manner by a securing element even when the electromechanical drive bringing about the displacement of the blocking element is a worm drive.

The invention is essentially based on the concept of using a driving wheel which is provided with a first control contour, preferably the worm wheel of a worm drive, on which a first cam for displacing the blocking element into its unlocking position is arranged. A second cam for actuating the securing element can be arranged in a supportable manner on this first control contour—or on a separate, second control contour likewise arranged on the driving wheel—in such a manner that, after the electromechanical drive is actuated but before the blocking element is displaced from the unlocking position into the locking position, the securing element, which is in its rest position, is first pivoted or displaced into its release position and only subsequently does the first control contour permit a movement of the first cam, and therefore of the blocking element, into the locked position.

In one embodiment of the invention, the pivot axis of the securing element is arranged parallel to the axis of rotation of the driving wheel, and the securing element has, at its one end, as a blocking part, in order to secure the blocking element in the unlocking position, an essentially L-shaped limb which can be pivoted under a step-shaped projection of the blocking element.

In a further embodiment of the invention, the blocking element comprises a bolt-shaped lower part and an essentially bow-shaped upper part adjoining the lower part, with at least a partial region of that arm of the upper part which lies opposite the bolt-shaped lower part being designed as the first control cam.

It has proven advantageous if the first control contour of the driving wheel has two curved sections, the first curved section being at a constant radial distance from the axis of rotation of the driving wheel and the second curved section having a profile which slopes away from the first section toward the axis of rotation of the driving wheel. In this case, the radial distance between the first curved section and the axis of rotation of the driving wheel is selected in such a manner that, when the first cam is supported on this curved section, the blocking element has reached its unlocking position. In addition, that length of this curved section which arises in the circumferential direction is selected in such a manner that, during the locking operation, the first cam is supported on the first curved section until the second cam has pivoted the securing element from its rest position into its release position.

In order to have the greatest possible forces available at the beginning of the unlocking operation in order to displace the blocking element, it is furthermore proven advantageous if, when use is made of a driving wheel in which the force is introduced into the edge of the driving wheel (toothed wheel drive), the second curved section extends into the immediate vicinity of the axis of rotation of the driving wheel.

BRIEF DESCRIPTION OF THE DRAWINGS

Further details and advantages of the invention emerge from the following exemplary embodiments which are explained with reference to figures in which:

FIG. 1 shows the side view of a first exemplary embodiment of a steering lock (illustrated schematically) in its unlocked and secured state, with the first and the second cams being arranged in a supportable manner on the same control contour;

FIG. 2 shows an enlarged side view of a partial region of the steering lock, which partial region is denoted in FIG. 1 by II;

DETAILED DESCRIPTION

Figure 3:
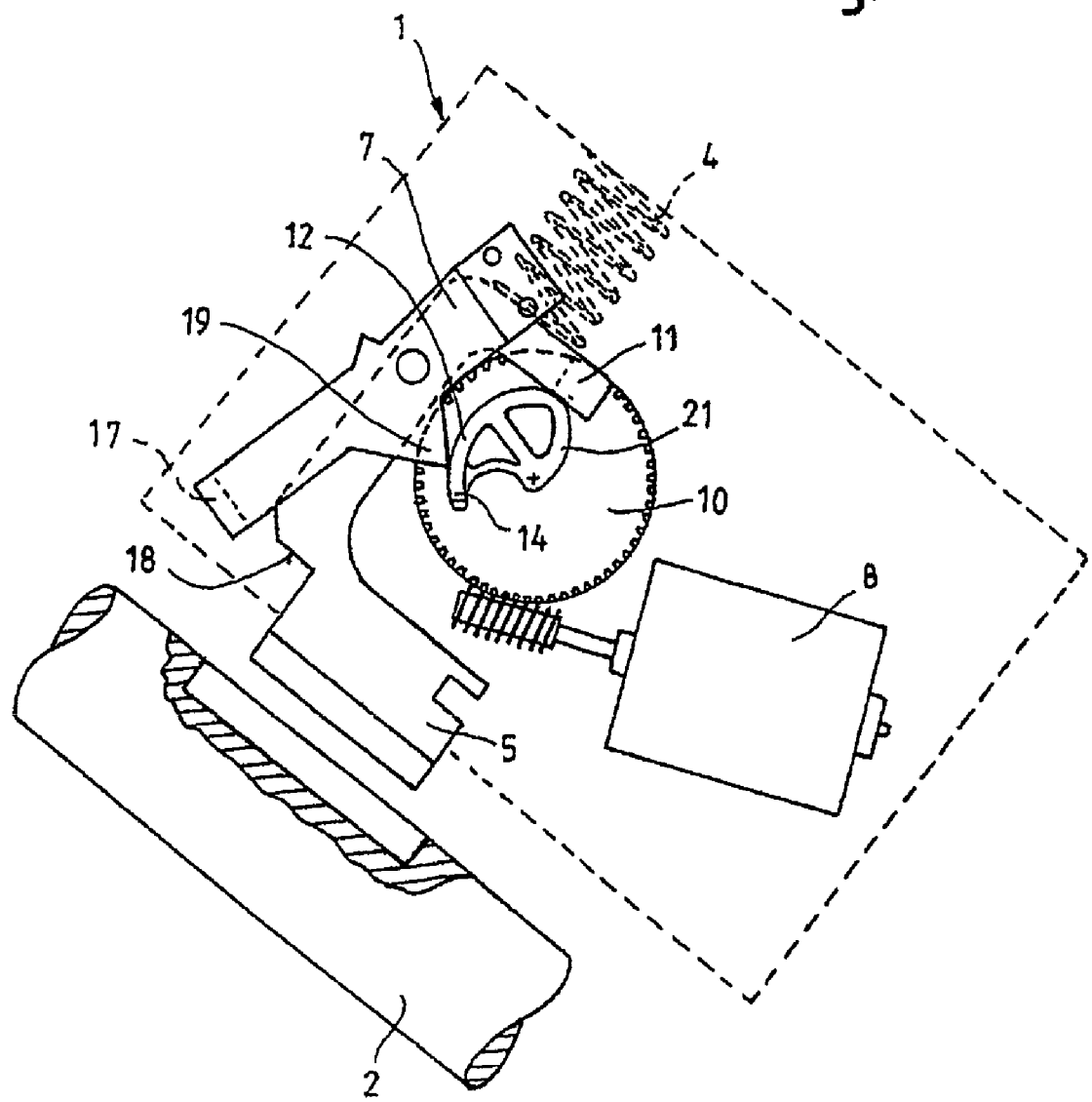
FIG. 3 shows the steering lock according to FIG. 1 during the locking phase.

In FIG. 1, 1 denotes a steering lock according to the invention for locking a steering spindle 2 of a motor vehicle. The steering lock 1 comprises a housing 100 (only indicated by dashed lines) and a blocking element 5 which is displaceable in the direction of its longitudinal axis 3 by means of a spring 4, is actuable from a locking position into an unlocking position by means of an electromechanical worm drive 6 and is securable in the unlocking position by means of a spring-actuated securing element 7 in the form of a lever.

The worm drive 6 essentially comprises an electric motor 8, on the output shaft of which there is a worm 9 which, for its part, engages in the teeth of a worm wheel 10 which is situated in a starting position.

The blocking element 5 comprises a bolt-shaped lower part 50 and a bow-shaped upper part 51 adjoining the lower part 50, with at least a partial region of that arm 52 of the upper part 51 which lies opposite the bolt-shaped lower part 50 being designed as the first cam 11. The blocking element 5 is supported via the first cam 11 on a first control contour 12 of the worm wheel 10, the axis of rotation 13 of which is arranged perpendicularly with respect to the longitudinal axis 3 of the blocking element 5.

In FIG. 1, the blocking element 5 is in its unlocking position, and the first cam 11 is therefore supported on a first curved section 14 of the first control contour 12 which curved section is at a maximum radial distance from the axis of rotation 13 of the worm wheel 10. In addition, the blocking element 5 is secured in this position by a securing element 7 in its rest position.

The securing element 7 is designed as a lever which can be pivoted about a pivot axis 15 parallel to the axis of rotation 13 of the worm wheel 10. In this case, the lower end 16 of the securing element 7 is of L-shaped design, with the horizontal limb 17 forming a blocking part which is pivoted under a step-shaped projection 18 of the blocking element 5 (FIG. 2). The securing element 7 is held in this rest position by a spring (not illustrated).

In addition, a second cam 19 is arranged on the securing element 7, which cam is not supported on the first control contour 12 of the worm wheel 10 in the case of the locking position of the blocking element 5 that is illustrated in FIG. 1.

If the blocking element 5 is to be displaced into its locking position, i.e. into a groove-shaped recess 20 of the steering spindle 2, the electric motor 8 is activated. The worm 9 then drives the worm wheel 10 which rotates counter-clockwise from its starting position illustrated in FIG. 1. In the process, the blocking element 5 first remains in its starting position until the first curved section 14 of the first control contour 12 reaches the second cam 19 and the securing element 7 pivots outward such that the blocking part 17 of the securing element 7 releases the blocking element 5 (FIG. 3).

Upon further rotation of the worm wheel 10, the second cam 19 firstly continues to be supported on the first curved section 14 of the first control contour 12 while the first cam 11 of the blocking element 5 is supported on a second curved section 21 of the first control contour 12, which curved section slopes away into the vicinity of the axis of rotation 13 of the worm wheel 10, and is pressed by the spring 4 into the groove-shaped recess 20 of the steering spindle 2.

Figure 4:
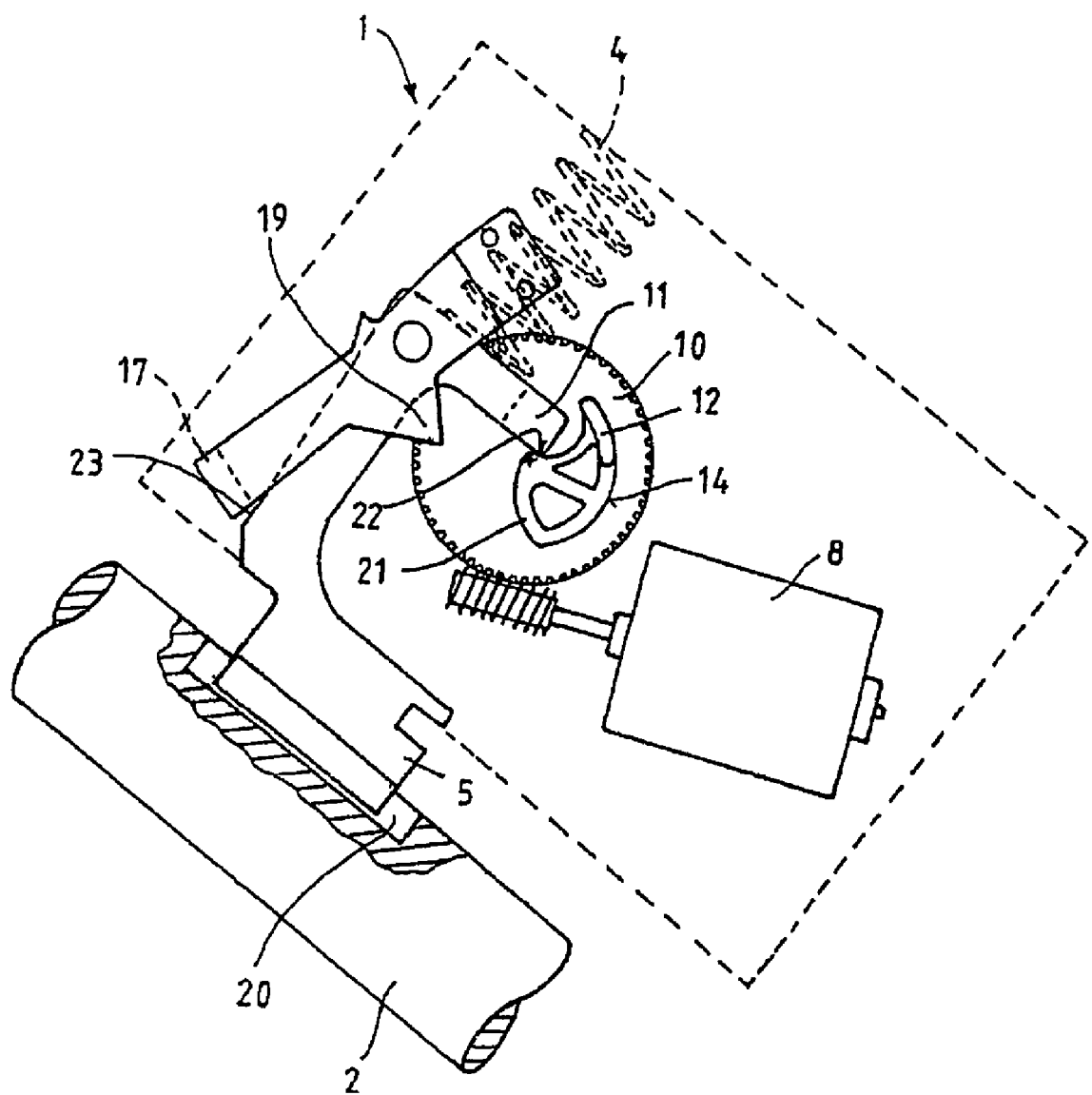
FIG. 4 shows the steering lock according to FIG. 1 in its locked position.

After the blocking element 5 has reached its locking position, the worm wheel 10 continues to rotate until it has again reached its starting position. Only then is the electric motor 8 switched off, for example with the aid of a corresponding contact switch (not illustrated). In this position, the first cam 11 is then supported on a supporting region 22 of the first control contour 12, which region is situated in the direct vicinity of the axis of rotation 13 of the worm wheel 10 (FIG. 4). In this case the securing element 7 is no longer held in its pivoted-out position by the second cam 19 but rather by the lateral edge 23 of the blocking element 5.

If the steering spindle 2 is to be unlocked again, the electric motor 8 is activated, for example by the insertion of an ignition key (not illustrated), in such a manner that the worm wheel 10 now rotates in the clockwise direction. The relatively large distance between the application of force by means of the worm 9 and the supporting region 22 of the first cam 11 initially causes the cam 11 to be subjected to a relatively large force such that clamping forces, which may act on the blocking element 5 in its locked position, are reliably overcome. The first cam 11 subsequently slides outward along the second curved section 21 and, in the process displaces the blocking element 5 upward. After the first cam 11 has reached the first curved section 14, the worm wheel 10 continues to rotate until it has again reached the starting position illustrated in FIG. 1. The electric motor 8 is subsequently switched off automatically.

Of course, the invention is not restricted to the exemplary embodiment illustrated in FIGS. 1-4. For example, instead of the worm wheel, use may also be made of the toothed wheel of another gear mechanism connected to the electric motor.

It may also be provided that, instead of the spring, which acts on the first cam, in order to displace the blocking element, a further cam or driver is provided which is connected to the blocking element and via which a correspondingly designed control contour presses the blocking element into its locking position (see in this respect, for example, also DE 100 41 018 A1).

In addition, the second cam can also interact with the control contour assigned to it in such a manner that, instead of a pivoting movement, a displacement perpendicular with respect to the longitudinal axis of the blocking element takes place.

Figure 5:
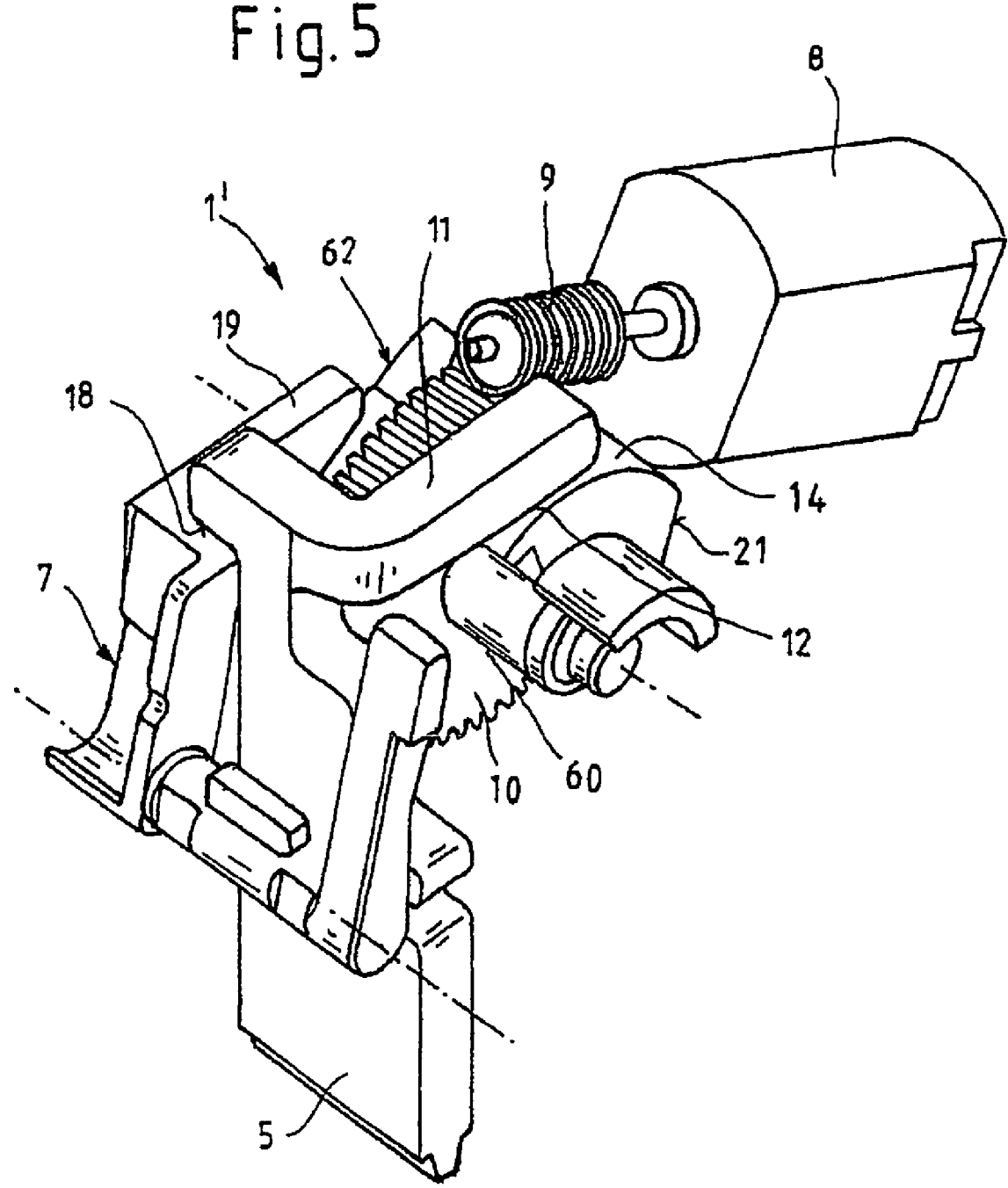
FIGS. 5 and 6 show the perspective views of a second exemplary embodiment according to the invention of a steering lock (illustrated schematically) in its unlocked and secured state, with the first and the second cams being arranged in a supportable manner on different control contours.
Figure 6:
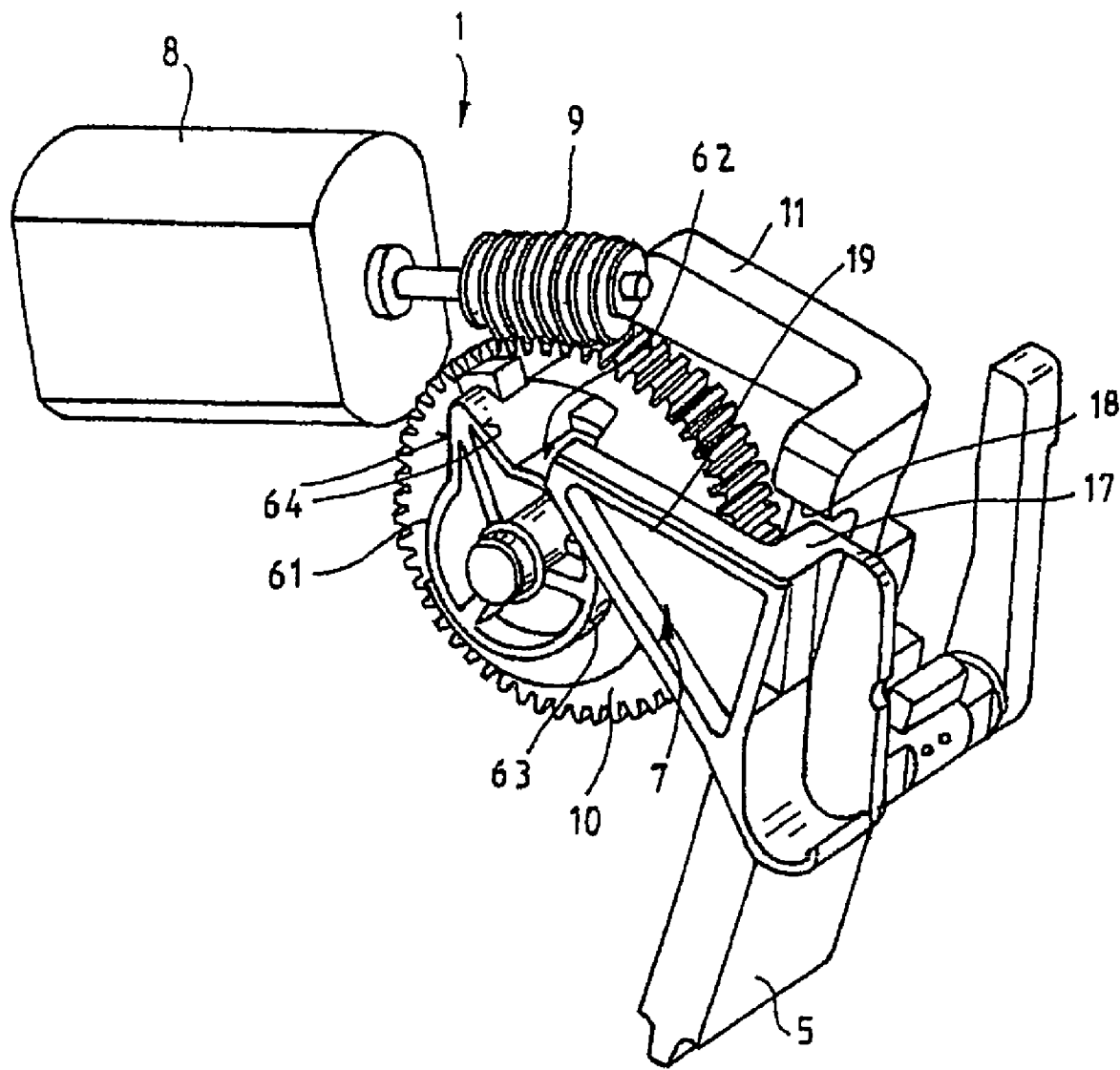

Furthermore, the first and the second cams 11, 19 can also be arranged in a supportable manner on different control contours of the driving wheel 10. FIGS. 5 and 6 show a corresponding exemplary embodiment of a steering lock 1' of this type. In this case, the parts which have the same function as the parts illustrated in the exemplary embodiment illustrated in FIGS. 1-4 are provided with the same reference numbers. In addition, for reasons concerned with better clarity, the parts indicated by dashed lines in FIGS. 1, 3 and 4 have been omitted.

As can be gathered from FIGS. 5 and 6 control contours 12, 62 are situated on both sides 60, 61 of the worm wheel 10. In this exemplary embodiment, only the first cam 11 of the blocking element 5 is situated on the control contour 12 arranged on the side 60 (FIG. 5). This control contour 12 in turn has two curved sections 14, 21 which correspond to the curved sections 14 and 21 described above in conjunction with the first exemplary embodiment.

The second cam 19 of the securing element 7 is supported on the second control contour 62 which is arranged on the opposite side 61 of the worm wheel 10 (FIG. 6). This control contour 62 is also essentially composed of two curved sections 63, 64. In this case, the second cam 19 is supported in the rest position of the securing element 7 (unlocked and secured state of the blocking element 5) on a first curved section 63 which is essentially at a constant radial distance from the axis of rotation 13 of the worm wheel 10. Upon rotation of the worm wheel 10, a second curved section 64, which is in the form of a point, causes the securing element 7 to pivot such that, during the locking operation of the blocking element 5, the blocking part 17 is again pivoted away from the step-shape projection 18 of the blocking element 5 and releases the blocking element 5.

LIST OF REFERENCE NUMBERS 1, 1' steering lock
2 steering spindle
3 longitudinal axis
4 spring
5 blocking element
6 drive, worm drive
7 securing element
8 electric motor
9 worm 10 driving wheel, toothed wheel, worm wheel
11 (first) cam
12 (first) control contour
13 axis of rotation
14 (first) curved section
15 pivot axis
16 lower end
17 limb, blocking part
18 projection
19 (second) cam
20 groove-shaped recess
21 (second) curved section
22 supporting region
23 edge
50 lower part
51 upper part
52 arm
60,61 sides
62 (second) control contour
63 (first) curved section
64 (second) curved section
100 housing

The invention claimed is:

1. A steering lock for locking the steering spindle of a motor vehicle steering system, the steering lock comprising:
   a) a blocking element which is displaced in the direction of a longitudinal axis of the blocking element, is actuable from a locking position into an unlocking position by means of an electromechanical drive and, in the unlocking position, is securable by a securing element which is in the form of a lever and is pivotable from a rest position into a release position about a pivot axis fixed on a housing of the steering lock;
   b) wherein for displacement of the blocking element, the blocking element is supported by at least a first cam on a first control contour of a driving wheel of the electromechanical drive, wherein the axis of rotation of the driving wheel is arranged perpendicularly with respect to the longitudinal axis of the blocking element;
   c) wherein the securing element is connected to a second cam which is likewise arranged in a supportable manner on a control contour connected to the driving wheel, with the control contour which is assigned to the securing element having a profile which is selected in such a manner that, after the electromechanical drive is activated in order to displace the blocking element from an unlocking position into the locking position, the securing element is first pivoted from the rest position into the release position and only subsequently is a movement of the blocking element into the locking position possible, wherein the securing element comprises, at one end, a blocking part which is formed by an L-shaped limb, and the blocking part is pivotable under a step-shaped projection of the blocking element in order to secure the blocking element in the unlocking position.

2. The steering lock as claimed in claim 1, wherein the pivot axis of the securing element is arranged parallel to the axis of rotation of the driving wheel.

3. The steering lock as claimed in claim 1, wherein the second cam of the securing element is arranged in supportable manner on the first control contour of the driving wheel, which control contour is assigned to the blocking element.

4. The steering lock as claimed in claim 1, wherein the second cam of the securing element is arranged in a supportable manner on a second control contour arranged separately from the first control contour.

5. The steering lock as claimed in claim 4, wherein the first control contour and the second control contour are arranged on the opposite sides of the driving wheel.

6. The steering lock as claimed in claim 1, wherein the first control contour of the driving wheel has two curved sections, the first curved section being at a constant radial distance from the axis of rotation of the driving wheel and the second curved section having a profile which slopes away from the first curved section toward the axis of rotation of the driving wheel, and in that the radial distance of the first curved section is selected in such a manner that, when the first cam is supported on this curved section, the blocking element has reached the unlocking position, and in that the length of this curved section is selected in such a manner that, during the locking operation, the first cam is supported on the first curved section until the second cam has pivoted the securing element from the rest position into the release position.

7. The steering lock as claimed in claim 6, wherein the second curved section extends into the immediate vicinity of the axis of rotation of the driving wheel.

8. The steering lock as claimed in claim 4, wherein;
   the first control contour of the driving wheel has two curved sections, the first curved section being at a constant radial distance from the axis of rotation of the driving wheel and the second curved section having a profile which slopes away from the first curved section toward the axis of rotation of the driving wheel, and in that the radial distance of the first curved section is selected in such a manner that, when the first cam is supported on this curved section, the blocking element has reached the unlocking position, and in that the length of this curved section is selected in such a manner that, during the locking operation, the first cam is supported on the first curved section until the second cam has pivoted the securing element from the rest position into the release position;
   the second control contour of the driving wheel has a second curved section which is designed in such a manner that, when the second cam is supported on this curved section, the securing element is pivoted from the rest position into the release position.

9. The steering lock as claimed in claim 1, wherein:
   the first control contour of the driving wheel has two curved sections, the first curved section being at a constant radial distance from the axis of rotation of the driving wheel and the second curved section having a profile which slopes away from the first curved section toward the axis of rotation of the driving wheel, and in that the radial distance of the first curved section is selected in such a manner that, when the first cam is supported on this curved section, the blocking element has reached the unlocking position, and in that the length of this curved section is selected in such a manner that, during the locking operation, the first cam is supported on the first curved section until the second cam has pivoted the securing element from the rest position into the release position;
   the blocking element has a bolt-shaped lower part and an essentially bow-shaped upper part adjoining the lower part, with at least a partial region of that arm of the upper part which lies opposite the bolt-shaped lower part being designed as a first cam.

10. The steering lock as claimed in claim 1, wherein:
    the first control contour of the driving wheel has two curved sections, the first curved section being at a constant radial distance from the axis of rotation of the driving wheel and the second curved section having a profile which slopes away from the first curved section toward the axis of rotation of the driving wheel, and in that the radial distance of the first curved section is selected in such a manner that, when the first cam is supported on this curved section, the blocking element has reached the unlocking position, and in that the length of this curved section is selected in such a manner that, during the locking operation, the first cam is supported on the first curved section until the second cam has pivoted the securing element from the rest position into the release position;

the driving wheel is a toothed wheel of the electromechanical drive.

11. The steering lock as claimed in claim 10, wherein:
the toothed wheel is the worm wheel of a worm wheel drive.

12. The steering lock as claimed in claim 2 wherein the second cam of the securing element is arranged in supportable manner on the first control contour of the driving wheel, which control contour is assigned to the blocking element.

13. The steering lock as claimed in claim 2, wherein the second cam of the securing element is arranged in a supportable manner on a second control contour arranged separately from the first control contour.

14. The steering lock as claimed in claim 2, wherein the first control contour of the driving wheel has two curved sections, the first curved section being at a constant radial distance from the axis of rotation of the driving wheel and the second curved section having a profile which slopes away from the first curved section toward the axis of rotation of the driving wheel, and in that the radial distance of the first curved section is selected in such a manner that, when the first cam is supported on this curved section, the blocking element has reached the unlocking position, and in that the length of this curved section is selected in such a manner that, during the locking operation, the first cam is supported on the first curved section until the second cam has pivoted the securing element from the rest position into the release position.

15. The steering lock as claimed in claim 3, wherein the first control contour of the driving wheel has two curved sections, the first curved section being at a constant radial distance from the axis of rotation of the driving wheel and the second curved section having a profile which slopes away from the first curved section toward the axis of rotation of the driving wheel, and in that the radial distance of the first curved section is selected in such a manner that, when the first cam is supported on this curved section, the blocking element has reached the unlocking position, and in that the length of this curved section is selected in such a manner that, during the locking operation, the first cam is supported on the first curved section until the second cam has pivoted the securing element from the rest position into the release position.

16. The steering lock as claimed in claim 4, wherein the first control contour of the driving wheel has two curved sections, the first curved section being at a constant radial distance from the axis of rotation of the driving wheel and the second curved section having a profile which slopes away from the first curved section toward the axis of rotation of the driving wheel, and in that the radial distance of the first curved section is selected in such a manner that, when the first cam is supported on this curved section, the blocking element has reached the unlocking position, and in that the length of this curved section is selected in such a manner that, during the locking operation, the first cam is supported on the first curved section until the second cam has pivoted the securing element from the rest position into the release position.

17. The steering lock as claimed in claim 5, wherein the first control contour of the driving wheel has two curved sections, the first curved section being at a constant radial distance from the axis of rotation of the driving wheel and the second curved section having a profile which slopes away from the first curved section toward the axis of rotation of the driving wheel, and in that the radial distance of the first curved section is selected in such a manner that, when the first cam is supported on this curved section, the blocking element has reached the unlocking position, and in that the length of this curved section is selected in such a manner that, during the locking operation, the first cam is supported on the first curved section until the second cam has pivoted the securing element from the rest position into the release position.

* * * * *